United States Patent
Gallone et al.

(10) Patent No.: US 8,322,137 B2
(45) Date of Patent: Dec. 4, 2012

(54) TURBO-CHARGED GASOLINE ENGINE WITH VARIABLE CONTROL OF INTAKE VALVES

(75) Inventors: Alessandro Gallone, Orbassano (IT); Caterina Venezia, Orbassano (IT); Francesco Vattaneo, Orbassano (IT)

(73) Assignee: C.R.F. Societá Consortile per Azioni, Orbassano (Turin) (IT)

( * ) Notice: Subject to any disclaimer, the term of this patent is extended or adjusted under 35 U.S.C. 154(b) by 666 days.

(21) Appl. No.: 12/273,222

(22) Filed: Nov. 18, 2008

(65) Prior Publication Data

US 2009/0255518 A1 Oct. 15, 2009

(30) Foreign Application Priority Data

Apr. 10, 2008 (EP) .................................. 08425243

(51) Int. Cl.
F02B 33/44 (2006.01)
F01L 9/02 (2006.01)
F01L 1/34 (2006.01)
F01L 1/14 (2006.01)
F02B 75/26 (2006.01)
F02B 75/04 (2006.01)
F02D 15/04 (2006.01)

(52) U.S. Cl. ................ 60/605.1; 123/90.12; 123/90.15; 123/90.16; 123/90.17; 123/90.48; 123/48 R

(58) Field of Classification Search ................ 60/605.1; 123/90.12, 90.15, 321, 564, 90.48, 48
See application file for complete search history.

(56) References Cited

U.S. PATENT DOCUMENTS

| | | | |
|---|---|---|---|
| 3,687,010 A * | 8/1972 | Paxton ............................ | 91/262 |
| 5,255,637 A | 10/1993 | Schechter | |
| 5,503,120 A | 4/1996 | Shirey et al. | |
| 5,586,533 A * | 12/1996 | Feucht ............................ | 123/321 |
| 5,724,927 A | 3/1998 | Suzuki | |
| 6,237,551 B1 * | 5/2001 | Macor et al. ................ | 123/90.15 |
| 6,655,349 B1 | 12/2003 | Cavanagh | |
| 6,973,904 B2 * | 12/2005 | Naumann ................... | 123/90.39 |
| 7,856,952 B2 * | 12/2010 | Armer .......................... | 123/48 A |
| 2003/0079702 A1 | 5/2003 | Phlips | |

(Continued)

FOREIGN PATENT DOCUMENTS

EP 0568214 A 11/1993

(Continued)

OTHER PUBLICATIONS

European Search Report for EP 08 42 5243 Dated Jul. 10, 2008.

*Primary Examiner* — Thomas Denion
*Assistant Examiner* — Cameron Setayesh
(74) *Attorney, Agent, or Firm* — Heslin Rothenberg Farley & Mesiti P.C.; Victor A. Cardona, Esq.

(57) ABSTRACT

In a turbo-charged gasoline engine the opening profile of each intake valve, defined by the opening and closing moments and by the lift, or by the opening stroke of the intake valve, is varied according to the engine operating conditions, so as to reduce or completely eliminate the intervention of a "wastegate" valve and ensure that in each engine operating condition each cylinder processes only the quantity of air necessary for optimal combustion, with an air/gasoline dosage value close to the stoichiometric ratio.

8 Claims, 4 Drawing Sheets

U.S. PATENT DOCUMENTS

| | | | |
|---|---|---|---|
| 2003/0084872 A1* | 5/2003 | Russell et al. | 123/348 |
| 2003/0097215 A1 | 5/2003 | Riedle et al. | |
| 2003/0213445 A1* | 11/2003 | Bloms et al. | 123/90.12 |
| 2005/0038577 A1* | 2/2005 | Dreibholz et al. | 701/22 |
| 2006/0081213 A1* | 4/2006 | Yang et al. | 123/321 |
| 2007/0193539 A1 | 8/2007 | Harada et al. | |
| 2007/0277779 A1* | 12/2007 | McClure et al. | 123/322 |
| 2008/0072874 A1* | 3/2008 | Baeuerle | 123/321 |
| 2009/0114194 A1* | 5/2009 | Armer | 123/48 R |

FOREIGN PATENT DOCUMENTS

| | | |
|---|---|---|
| EP | 0803642 A | 10/1997 |
| EP | 0931912 A2 | 7/1999 |
| EP | 0939205 A1 | 9/1999 |
| EP | 1091097 A1 | 4/2001 |
| EP | 1243761 A1 | 9/2002 |
| EP | 1243762 A2 | 9/2002 |
| EP | 1243763 A2 | 9/2002 |
| EP | 1243764 A2 | 9/2002 |
| EP | 1245799 A2 | 10/2002 |
| EP | 1273770 A2 | 1/2003 |
| EP | 1321634 A2 | 6/2003 |
| EP | 1338764 A1 | 8/2003 |
| EP | 1344900 A2 | 9/2003 |
| EP | 0961870 B1 | 3/2004 |
| EP | 1635045 A1 | 3/2006 |
| EP | 1635046 A1 | 3/2006 |
| EP | 1653057 A1 | 5/2006 |
| EP | 1674673 A1 | 6/2006 |
| EP | 1726790 A1 | 11/2006 |
| WO | 98/34014 A | 8/1998 |
| WO | 2008/000899 A | 1/2008 |

* cited by examiner

TURBO-CHARGED GASOLINE ENGINE WITH VARIABLE CONTROL OF INTAKE VALVES

CROSS REFERENCE TO RELATED APPLICATIONS

This application claims priority from European Patent Application No. EP 08425243.6, filed on Apr. 10, 2008, the entire disclosure of which is incorporated herein by reference.

BACKGROUND OF THE INVENTION

The present invention relates to turbo-charged gasoline engines of the type comprising:
at least one cylinder and an intake valve and an exhaust valve associated with the cylinder,
an intake conduit and an exhaust conduit connected to the cylinder,
a compressor interposed in the intake conduit, for supercharging the cylinder,
a turbine interposed in the exhaust conduit and mechanically coupled to the compressor, to exploit the exhaust gases from the engine in order to drive the supercharger compressor,
sensor means of the engine's operating conditions,
control means of the cylinder compression ratio, adapted to vary the opening time of the intake valve, and
an electronic unit that controls the aforementioned control means of the compression ratio, according to the output signals of said sensor means, in order to decrease the compression ratio as the engine speed increases, in order to prevent or reduce the need to deviate part of the exhaust gases in a by-pass conduit connected in parallel to the turbine.

An engine of the type specified above is, for example, described and shown in U.S. Pat. No. 5,255,637. According to such known solution, it is envisaged to reduce or completely eliminate the intervention of the so called "waste-gate" valve, which controls the flow rate of the exhaust gases through the aforementioned by-pass conduit. Such a valve is normally used in turbo-charged engines in order to prevent too high supercharger pressures at high engine speeds. In such conditions, part of the gases combusted is discharged in the by-pass conduit, instead of being directed through the turbine. In the engine shown in U.S. Pat. No. 5,255,637, the intervention of the "waste-gate" valve is reduced or eliminated thanks to the predisposition of means for reducing the compression ratio of the engine, through a variation of the closing moment of the intake valve (before or after the bottom dead centre) when a sensor associated with the combustion chamber detects a trend towards detonation.

SUMMARY OF THE INVENTION

The object of the present invention is to perfect the aforementioned known solution, guaranteeing regular and efficient operation of the engine and, in particular, reduced fuel consumption.

In view of reaching this object, the scope of the invention is an engine having the characteristics indicated in the introduction of the present description and also characterized in that the aforementioned sensor means is used to detect the engine speed and to estimate the engine torque required by the driver and that the aforementioned control means comprises means adapted to vary the opening profile of the intake valve, that is, both the opening and closing moments, and the lift (meaning the maximum length of the opening stroke) of the intake valve, and in that the aforementioned control unit is programmed to control said control means of the compression ratio in order to obtain a determined opening profile of the intake valve for every specific operating condition, or for every specific pair of values of the engine speed and the engine torque required by the driver, maintaining the air/gasoline dosage close to the stoichiometric value at the same time.

In the present description, and in the following claims, where reference is made to the "intake valve" of an engine cylinder, it is intended to consider both the case in which each cylinder has only one intake valve, and also that in which one cylinder has various intake valves, in which case the indications herein can be valid for just one or for each intake valve.

According to a preferred embodiment of the invention, the aforementioned control means of the compression ratio comprise a variable driving system of the intake valve, comprising a cam supported by a camshaft of the engine, a tappet cooperating with the cam to control said intake valve, and a hydraulic system interposed between the tappet and the intake valve, comprising a pressure chamber that can be connected with an exhaust channel through a solenoid valve and electronic control means of said solenoid valve. When the solenoid valve is closed, the aforementioned chamber fills with fluid under pressure, whereby the intake valve is controlled by the respective cam, whilst when the solenoid valve is open, the fluid is discharged from the chamber under pressure and the intake valve closes due to the effect of spring means associated with it, also when the chamber is in a position in which it would tend to keep the intake valve open, and electronic control means of said solenoid valve.

The applicant developed a variable driving system of the engine's intake valves some time ago, of the type specified above, identified with the brands UNIAIR and MULTIAIR (see EP-A-0803642, EP-A-0961870, EP-A-0931912, EP-A-0939205, EP-A-1091097, EP-A-1245799, EP-A-1243763, EP-A-1243762, EP-A-1243764, EP-A-1243761, EP-A-1273770, EP-A-1321634. EP-A-1338764, EP-A-1344900, EP-A-1635045, EP-A-1635046, EP-A-1653057, EP-A-1674673, EP-A-1726790).

Such a variable driving system of the valves is able to vary not only the opening and closing moment of the intake valve, but also the valve lift. The present invention comes from the idea to apply such a system known per se to a turbo-charged gasoline engine, and to control the system so as to obtain efficient control (and in particular with the guarantee of low consumption) of the engine, reducing or completely eliminating the intervention of the "waste-gate" valve.

According to the invention, such a result is obtained due to the fact that the opening profile of the valve (which is defined both by the valve opening and closing moments, and the valve opening stroke) can be varied as preferred so as to be adapted to each specific engine operating condition. Hence, for each engine operating condition identified by a specific pair of values of the engine speed and the engine torque required by the driver, a specific valve opening profile can be stored, such that the electronic unit being part of the system according to the invention carries out such a profile when the sensor means indicates that the engine is in the corresponding operating condition.

The means for estimating the engine torque required by the driver can comprise a sensor of the accelerator pedal position and electronic means for processing the output signals of such a sensor, so as to estimate the engine torque required, according to any predetermined algorithm. If necessary, such a process can also provide for the calculation of the accelerator pedal movement speed and also take into consideration such a parameter in the estimation of the engine torque required.

Thanks to the aforementioned characteristics, the engine is therefore able to obtain significant advantages compared to the known systems, as will be described in detail as follows.

BRIEF DESCRIPTION OF THE DRAWINGS

The invention will now be described with reference to the attached drawings, provided by way of a non-limitative example, in which.

DETAILED DESCRIPTION OF THE INVENTION

Figure 1:
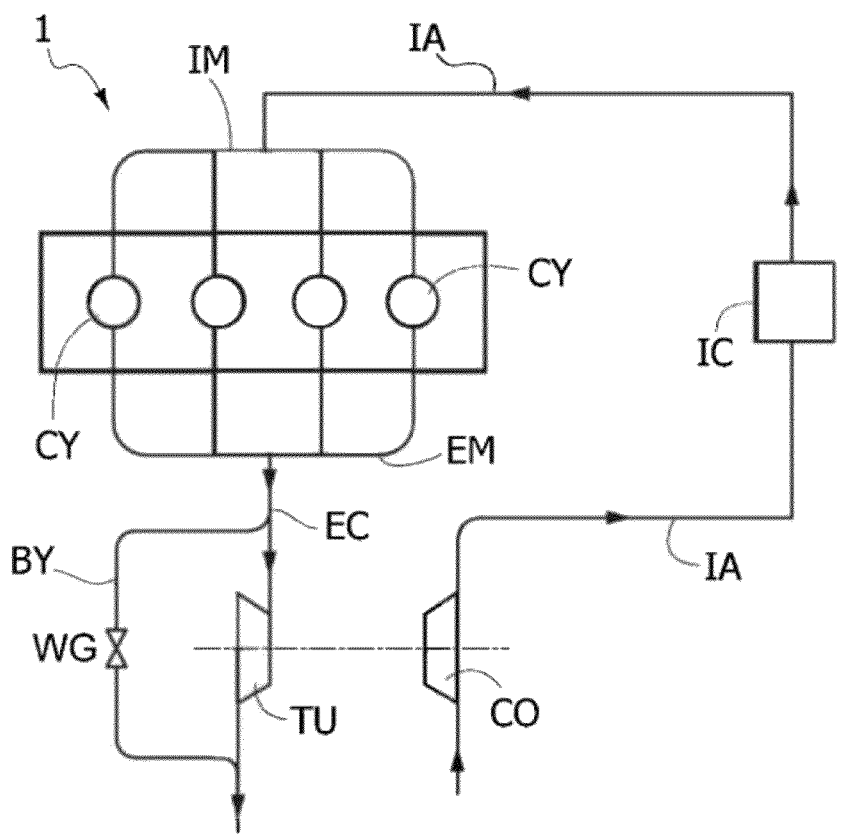
FIG. 1 is a schematic view of a turbo-charged gasoline engine of the type to which the invention can be applied.

FIG. 1 schematically shows a turbo-charged gasoline engine, indicated as a whole with the number 1. The engine 1 comprises four cylinders CY with the respective intake conduits connected to an intake manifold IM and respective exhaust conduits connected to an exhaust manifold EM. The exhaust gases coming from the exhaust manifold EM are directed through an exhaust conduit EC in which a turbine TU is interposed which is mechanically coupled to a compressor CO inserted in the intake conduit which directs the incoming air to the intake manifold IM. A cooling device IC is interposed in the conduit IA. In parallel with the turbine TU a by-pass conduit BY is connected in which a waste-gate valve WG is inserted.

In a traditional engine of the type shown in FIG. 1, the waste-gate valve WG intervenes above a threshold value of engine charge, variable according to the engine speed, so as to prevent a part of the exhaust gases passing through the turbine, hence reducing the supercharging pressure.

Figure 2:
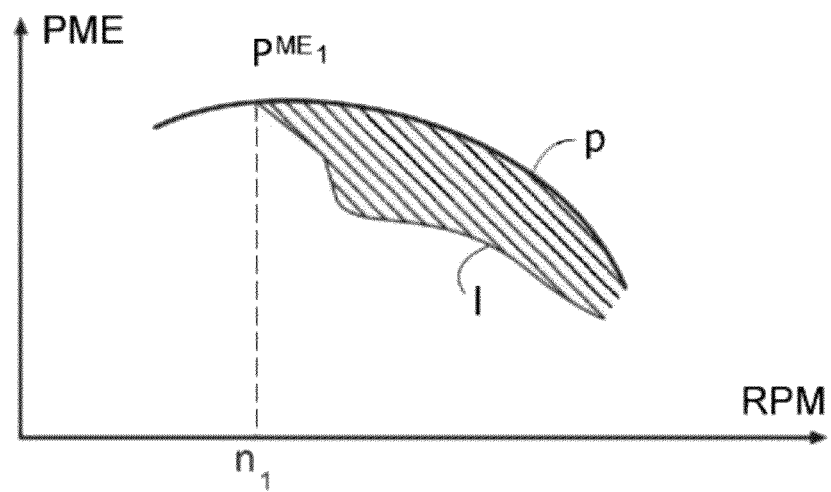
FIG. 2 shows the principles on which the invention is based.

FIG. 2 shows the variation in the average effective pressure of the engine according to the variation of the engine speed. The average effective pressure reaches a $p_{ME1}$ value in line with an $n_1$ value of the engine speed. Above the speed $n_1$, the valve WG is opened whenever the identification point of the engine operating condition is within the area outlined in FIG. 2, included between the line p and the line 1.

In a traditional engine, the mass of air trapped in the cylinder is univocally defined by the intake valve lift and the supercharging pressure, which is regulated through the waste-gate valve WG.

Still in the case of traditional engines, the desired average effective pressure value pme is obtained, in each engine operating condition, optimising the advance of the ignition as well as the value of the ratio λ between the dosing (air/gasoline) and the stoichiometric ratio (such a value λ is therefore less than one in the case of a richer mixture compared to the stoichiometric ratio). In particular, in a traditional engine, as the engine speed and charge increases, it is attempted to prevent the phenomenon of detonation by reducing the ignition advance and increasing the richness of the mixture, so that, due to lack of air to burn the excess gasoline, it evaporates in the combustion chamber, generating cooling that keeps the combustion temperature low. Controlling the correct operation of the engine is hence obtained, in a traditional engine, with higher consumption.

The idea at the basis of the present invention is that of obtaining control of the quantity of air trapped in the engine cylinder by varying the opening profile of the intake valve (meaning the opening and lift time) regardless of the supercharging pressure.

Figure 3:
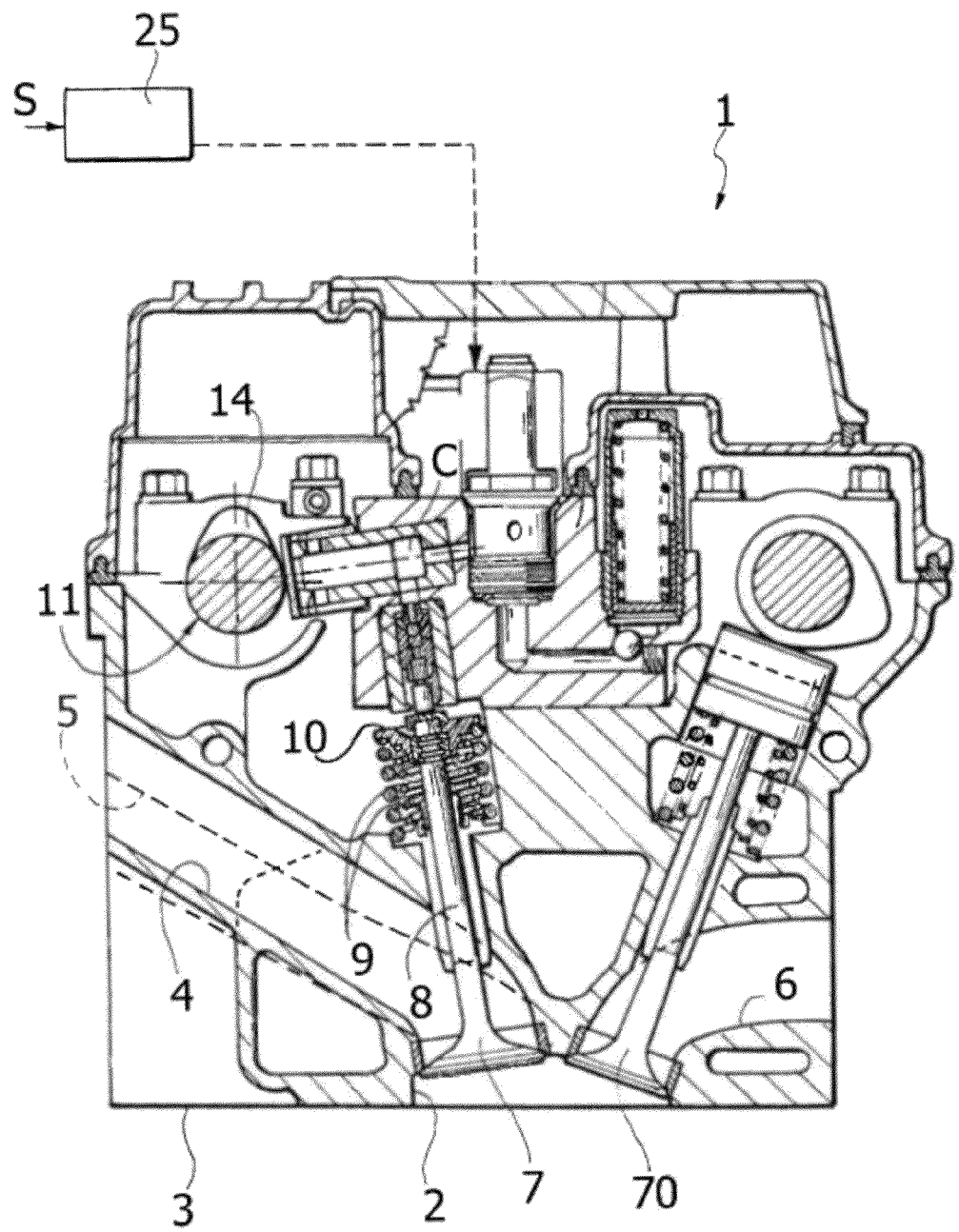
FIG. 3 is a sectional view of a variable driving system of the valves of the known type for example in EP-A-803642.

This result is obtained in a particularly advantageous way thanks to the application of a variable driving system of the valves of the known type mentioned above, developed by the same applicant. FIG. 3 of the attached drawings shows merely by way of example a variable driving system of the valves of the type mentioned above which is described in the European Patent EP-A-0 803 642 of the same applicant.

FIG. 3 illustrates the head 1 of an engine with four cylinders in line comprising, for each cylinder, a recess 2 formed in the base surface 3 of the head 1, defining the combustion chamber, into which two intake conduits 4 and 5 flow and two exhaust conduits 6 controlled by two intake valves 7 and two exhaust valves 70. Still in the case of the example shown, the intake valves 7 are controlled by the cams 14 of a camshaft 11 through a hydraulic system. The hydraulic driving system of each valve includes a hydraulic chamber C which is controlled by a solenoid valve 24 normally open, controlled by a programmable electronic control unit 25. When the solenoid valve 24 is activated, the engine valve follows the movement of the cam (full lift). Advance closing of the valve can be obtained by deactivating (opening) the solenoid valve 24, in order to empty the hydraulic chamber and obtain closure of the engine valve under the action of the respective return springs, indicated with the number 9. Similarly, delayed opening of the valve can be obtained by delaying the activation of the solenoid valve, whilst the combination of delayed opening with advance closing of the valve can be obtained with the activation and deactivation of the solenoid valve during the thrust of the relative cam.

Figure 4:
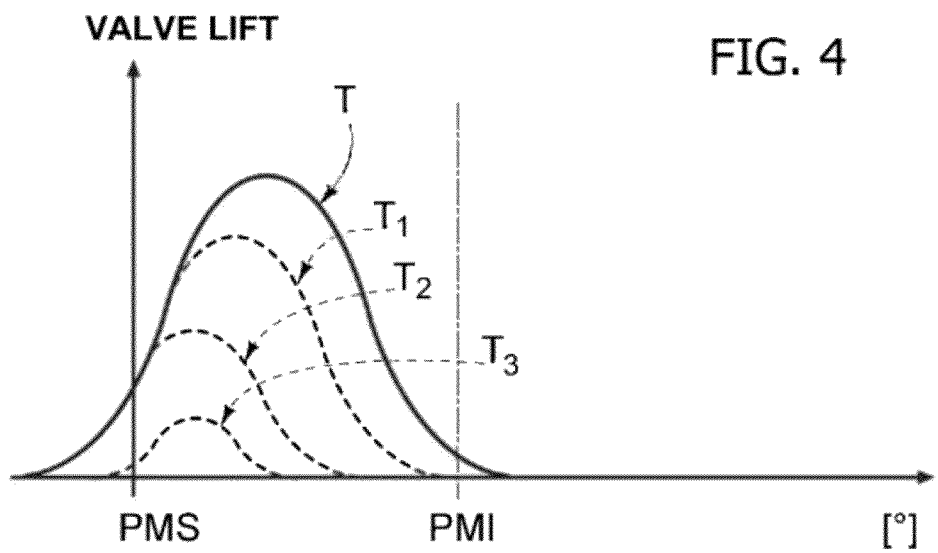
FIGS. 4 and 5 are diagrams showing the principles on which the invention is based.

FIG. 4 of the attached drawings shows how, through a system of the type mentioned above, the lift profile of the intake valve can be varied as preferred. Should the solenoid valve 24 be kept constantly energized, each intake valve follows the traditional lift profile, indicated with T in FIG. 4. By controlling the deactivation of the solenoid valve 24 in a variable way, it is possible to obtain a multiplicity of alternative profiles T1, T2, T3, each of which differs both according to the opening duration of the valve, and the opening stroke of the valve. The examples shown refer to advance closing cases of the intake valve compared to the bottom dead centre, profile T3 also providing for delayed opening.

Figure 5:
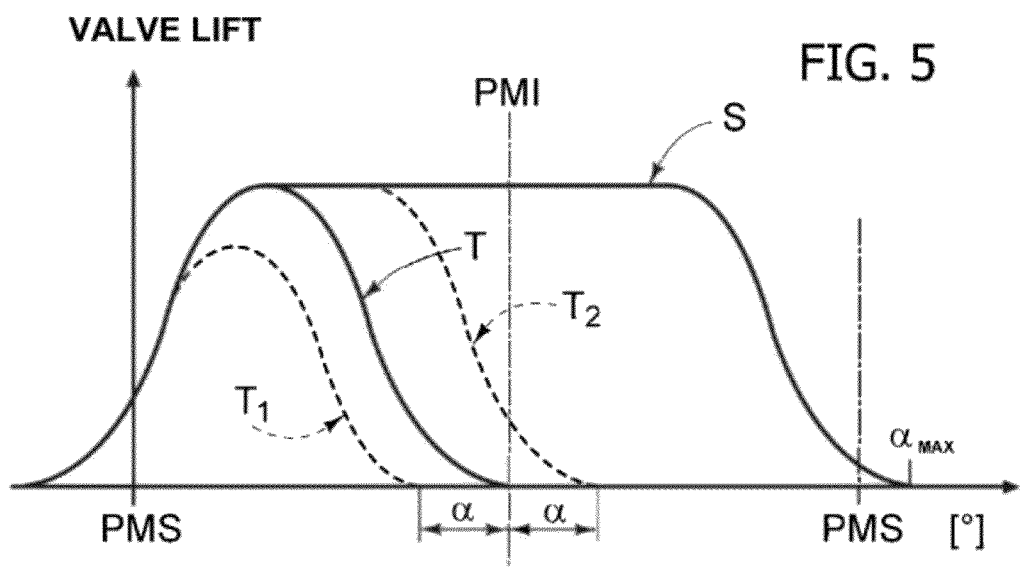

FIG. 5 shows an alternative case, in which the cam that controls the intake valve has such a profile as to carry out the lift profile indicated with S in FIG. 5. In this case, the cam is of the type shown schematically in FIG. 5A, whose profile presents the maximum radial dimension for an angular stretch of a determined size. In this case, by controlling the solenoid valve, it is possible to move the intake valve, instead of according to profile S in FIG. 5, which provides for deferred closing of an angle $\alpha_{MAX}$ compared to bottom dead centre (BDC), a traditional type cycle T, or a cycle T1 with advance closing compared to the BDC of an angle α or a cycle T2 with deferred closing compared to the BDC of the same angle α. Controlling the solenoid valve according to Profile T2 or according to profile T1 carries out a reduction in the compression ratio in any case, with the aforementioned advantages.

In this case the system therefore guarantees maximum flexibility in terms of the lift profile that can be obtained for the intake valve. Furthermore, in this way the air is let into the cylinder with fewer fluid dynamic leaks compared to the case of Profile T1, thanks to the greater lift of the valve.

Figure 5A:
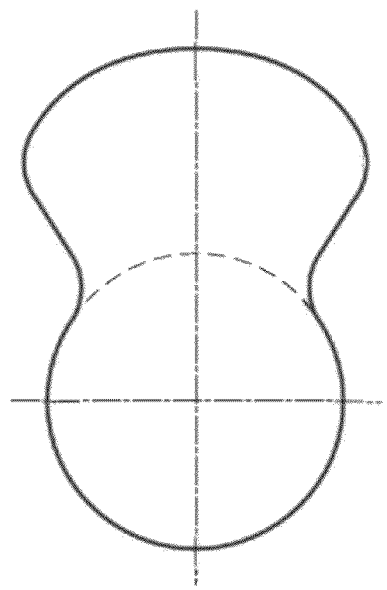
Figure 6:
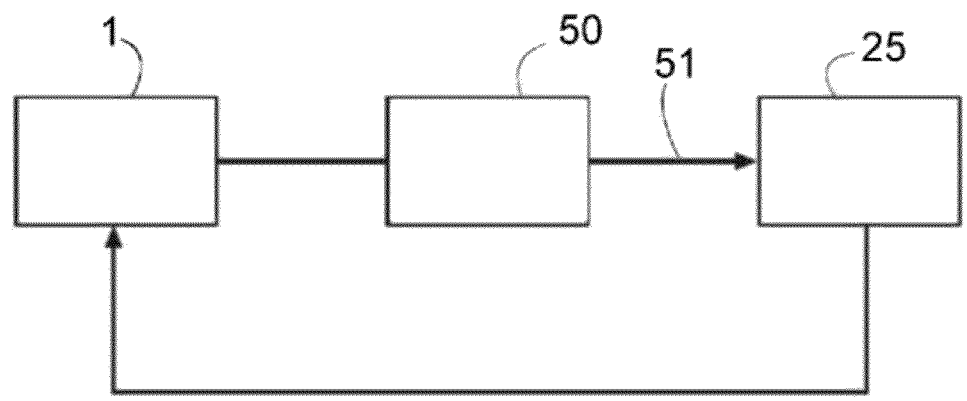
FIG. 6 is a block diagram of the control system being part of the invention.

FIG. 5A is a side view of a can for controlling an intake valve according to the profile depicted in FIG. 5;

According to the invention, engine 1 (FIG. 6) is associated with sensor means 50 of any known type adapted to detect the engine operating conditions and in particular adapted to detect the engine speed and to estimate the torque required by the driver. According to the output signal 51 of the sensor means 50, the electronic unit 25 (see also FIG. 3) that controls the operation of the solenoid valves 24 associated with the engine cylinders, provides to control such solenoid valves in order to obtain a desired intake valve lift profile.

It is possible in this way to control the system in order to obtain a reduction in the engine compression ratio at high speeds and at high charges, hence reducing or completely eliminating the intervention of the waste-gate valve WG.

With the system according to the invention, the air mass trapped in each cylinder can be regulated to the optimal value regardless of the supercharging pressure and undergoes lower cooling, due to the lower value of the effective compression ratio. The lower temperature allows closer λ ratio values to 1 to be used (or closer dosage mixtures to the stoichiometric value), at the same time keeping the ignition advance time at optimal value and hence reducing consumption.

The increase in enthalpy upstream of the turbine increases the supercharger pressure triggering a virtuous circle: the further increase in supercharging pressure allows a further reduction in the compression ratio, with consequent further cooling, a reduction in the quantity of trapped air, and consequent further thinning down of the mixture and a further increase in the supercharging pressure, and so on again from the start of this cycle. The optimisation process converges asymtotically until the optimal combustion conditions are reached with minimum consumption and maximum enthalpy, compatible with minimum detonation and exhaust gas temperature values.

Compared to the known systems which already made use of control means of the compression ratio so as to reduce and prevent the intervention of the waste-gate valve, the system according to the invention allows optimal results to be obtained, thanks to the possibility to intervene not only on the opening time, but also on the lift of the intake valve and carrying out a specific lift profile of each intake valve corresponding to each engine operating condition identified by a point in the average effective pressure/speed diagram.

In the engine according to the invention, only the necessary quantity of air is used, for optimal combustion. Enthalpy is not wasted at the exhaust, but is used for increasing the supercharger pressure, whilst the control of the intake valves allows a reduction in the temperature and an increase in the turbulence of the air taken in to be obtained.

The enthalpy level at the exhaust is controlled by the regulation of the air quantity, through the intake valve, so as to prevent irregular operations of the turbo-charged engine. The system according to the invention is intrinsically safe, thanks to the particular characteristics of the "MULTIAIR" system.

Naturally, various modifications to the construction details and the embodiments can be possible, within the spirit of the invention according to that described and disclosed merely by way of a non-limitative example, without departing from the scope of the present invention.

The invention claimed is:
1. A turbo-charged gasoline engine, comprising:
at least one cylinder, and an intake valve and an exhaust valve associated with the cylinder,
an intake conduit and an exhaust conduit connected to the cylinder,
a compressor interposed in the intake conduit, for supercharging the cylinder,
a turbine interposed in the exhaust conduit and mechanically coupled to the compressor, to exploit the exhaust gases of the engine in order to drive the supercharging compressor,
sensor means for sensing the engine's operating conditions,
control means for controlling the compression ratio in the cylinder, said control means adapted to vary the opening time of the intake valve, and
an electronic unit that controls said control means, according to the output signals of said sensor means, in order to decrease the compression ratio as a speed of the engine and a charge of the engine increases, in order to prevent or reduce the need to deviate part of the exhaust gases in a by-pass conduit connected in parallel to the turbine,
wherein the sensor means is used to detect the engine speed,
wherein said control means of the compression ratio comprises means adapted to vary the opening profile of the intake valve, or both the opening and/or closing moment and the lift of the intake valve, and
wherein said control unit is programmed to control said control means of the compression ratio, so as to obtain a determined lift profile of the intake valve for each specific operating condition, maintaining the air/gasoline dosage close to the stoichiometric value at the same time,
wherein said sensor means estimates the engine torque required by the driver and said control means comprises means adapted to vary the opening profile of the intake valve,
said control unit programmed to control said control means of the compression ratio so as to obtain a determined lift profile of the intake valve for each specific pair of values of the engine speed and the engine torque required by the driver,
wherein said control means comprise a variable driving system of the intake valve, comprising:
a cam, supported by a camshaft of the engine,
a tappet cooperating with the cam to control the intake valve,
a hydraulic system interposed between the tappet and the intake valve, comprising, a hydraulic chamber connected with the exhaust conduit through a solenoid valve and configured to cause the closing of the intake valve due to the respective spring means even if the cam is in a position in which it would tend to keep the intake valve open, and
electronic control means of the solenoid valve;
wherein the cam comprises a base arc portion having a first radius and a raised arc portion having a second radius greater than the first radius, said second radius being constant through a substantial angle of rotation of said cam such that the intake valve is maintained at a full lift position during said substantial angle of rotation, said second radius having an outer surface contacting said tappet during said substantial angle of rotation, wherein by controlling said solenoid valve the closing of the intake valve can be obtained both according to the conventional cycle, and with the advance of an angle α compared to the BDC, according to an advance closing cycle, and with a delay of an angle α compared to the BDC, with $\alpha \leq \alpha_{MAX}$, according to a delayed closing cycle.

2. The engine according to claim 1, wherein the sensor means comprises means for estimating the engine torque required by the driver, said means for estimating comprises a sensor of the accelerator pedal position and electronic means for processing the output signals of such a sensor, so as to estimate the torque required by the engine, according to a predetermined algorithm.

3. The engine according to claim 2, wherein the output signal of said sensor of the accelerator pedal position is processed also by calculating the movement speed of the accelerator pedal, the estimation of the required torque being carried out also according to such a speed.

4. A method to control a turbo-charged gasoline engine of the type comprising:
at least one cylinder and an intake valve and an exhaust valve associated with the cylinder,
an intake conduit and an exhaust conduit connected to the cylinder,
a compressor interposed in the intake conduit, for supercharging the cylinder,
a turbine interposed in the exhaust conduit and mechanically coupled to the compressor, to exploit the exhaust gases of the engine in order to drive the supercharging compressor,
wherein the engine operating conditions are detected and the compression ratio of the cylinder is controlled according to the engine operating conditions so as to reduce the compression ratio as the engine speed and charge increases, in order to prevent or reduce the need to deviate part of the exhaust gases into a by-pass conduit connected in parallel to the turbine,
wherein the engine speed is detected and the compression ratio is varied through a variation in the opening profile of the intake valve, or by varying both the opening and/or closing moment and the lift of the intake valve, so as to obtain a determined lift profile of the intake valve for each specific engine operating condition, at the same time keeping the air/gasoline dosage close to the stoichiometric value
wherein the engine torque required by the driver is estimated and the compression ratio is varied for each specific pair of values of the engine speed and the engine torque required by the driver;
wherein the opening profile of each intake valve is varied with the aid of a variable operating system of the intake valves, comprising:
a cam, supported by a camshaft of the engine,
a tappet cooperating with the cam to control the intake valve,
hydraulic system interposed between the tappet and the intake valve, comprising a hydraulic chamber which can be connected with an exhaust channel through a solenoid valve, in order to cause the closing of the intake valve due to the respective spring means even if the cam is in a position in which it would tend to keep the intake valve open, and
electronic control means of the solenoid valve
wherein the cam comprises a base arc portion having a first radius and a raised arc portion having a second radius greater than the first radius, the second radius being constant through a substantial angle of rotation of said cam such that the intake valve is maintained at a full lift position during the substantial angle of rotation, the second radius having an outer surface contacting the tappet during the substantial angle of rotation, wherein by controlling said solenoid valve the closing of the intake valve can be obtained both according to the conventional cycle, and with the advance of an angle α compared to the BDC, according to an advance closing cycle, and with a delay of an angle α compared to the BDC, with $\alpha \leq \alpha_{MAX}$, according to a delayed closing cycle.

5. The method according to claim 4, wherein the estimation of the engine torque required by the driver is carried out utilizing a sensor of the accelerator pedal position and by processing the output signals of such a sensor in order to estimate the engine torque required, according to a predetermined algorithm.

6. The method according to claim 5, wherein the output signal of said sensor of the accelerator pedal position is processed also by calculating the movement speed of the accelerator pedal, the estimation of the required torque being carried out also according to such a speed.

7. The method according to claim 4, wherein the cam comprises two opposite side surfaces extending away from the base arc portion to the raised arc portion, the opposite side surfaces diverging from one another and connecting the base arc portion and the raised arc portion.

8. A turbo-charged gasoline engine, comprising:
at least one cylinder, and an intake valve and an exhaust valve associated with the cylinder,
an intake conduit and an exhaust conduit connected to the cylinder,
a compressor interposed in the intake conduit, for supercharging the cylinder,
a turbine interposed in the exhaust conduit and mechanically coupled to the compressor, to exploit the exhaust gases of the engine in order to drive the supercharging compressor,
sensor means for sensing the engine's operating conditions,
control means for controlling the compression ratio in the cylinder, said control means adapted to vary the opening time of the intake valve, and
an electronic unit that controls said control means, according to the output signals of said sensor means, in order to decrease the compression ratio as a speed of the engine and a charge of the engine increases, in order to prevent or reduce the need to deviate part of the exhaust gases in a by-pass conduit connected in parallel to the turbine,
wherein the sensor means is used to detect the engine speed,
wherein said control means of the compression ratio comprises means adapted to vary the opening profile of the intake valve, or both the opening and/or closing moment and the lift of the intake valve, and
wherein said control unit is programmed to control said control means of the compression ratio, so as to obtain a determined lift profile of the intake valve for each specific operating condition, maintaining the air/gasoline dosage close to the stoichiometric value at the same time,
wherein said sensor means estimates the engine torque required by the driver and said control means comprises means adapted to vary the opening profile of the intake valve,
said control unit programmed to control said control means of the compression ratio so as to obtain a determined lift profile of the intake valve for each specific pair of values of the engine speed and the engine torque required by the driver, wherein said control means comprise a variable driving system of the intake valve, comprising:
- a cam, supported by a camshaft of the engine,
- a tappet cooperating with the cam to control the intake valve,
- a hydraulic system interposed between the tappet and the intake valve, comprising a hydraulic chamber connected with the exhaust conduit through a solenoid valve and configured to cause the closing of the intake valve due to the respective spring means even if the cam is in a position in which it would tend to keep the intake valve open, and
- electronic control means of the solenoid valve;

said cam comprising an inner circular portion and an outer extended portion, said extended portion comprising two opposite side surfaces extending away from said circular portion and diverging from one another, said opposite side surfaces extending to an extended arc portion, said extended arc portion contacting said tappet to maintain the intake valve at a full lift position during a substantial angle of rotation of said cam, wherein by controlling said solenoid valve the closing of the intake valve can be obtained both according to the conventional cycle, and with the advance of an angle $\alpha$ compared to the BDC, according to an advance closing cycle, and with a delay of an angle $\alpha$ compared to the BDC, with $\alpha \leq \alpha_{MAX}$, according to a delayed closing cycle.

* * * * *